United States Patent
Chang

(10) Patent No.: US 9,908,553 B2
(45) Date of Patent: Mar. 6, 2018

(54) MULTI-FUNCTION BABY CARRIAGE

(71) Applicant: In Hwan Chang, Seoul (KR)

(72) Inventor: In Hwan Chang, Seoul (KR)

( * ) Notice: Subject to any disclaimer, the term of this patent is extended or adjusted under 35 U.S.C. 154(b) by 0 days.

(21) Appl. No.: 14/828,757

(22) Filed: Aug. 18, 2015

(65) Prior Publication Data

US 2017/0050661 A1 Feb. 23, 2017

(51) Int. Cl.
| | | |
|---|---|---|
| *B62B 3/02* | (2006.01) | |
| *B62B 9/00* | (2006.01) | |
| *B62B 7/06* | (2006.01) | |
| *B62B 7/08* | (2006.01) | |
| *B62B 7/12* | (2006.01) | |

(Continued)

(52) U.S. Cl.
CPC .............. *B62B 7/12* (2013.01); *A47D 11/005* (2013.01); *A47D 13/025* (2013.01); *B60N 2/2845* (2013.01); *B60N 2/2848* (2013.01)

(58) Field of Classification Search
CPC .... B62B 7/00; B62B 7/04; B62B 7/06; B62B 7/064; B62B 7/068; B62B 7/002; B62B 7/004; B62B 7/006; B62B 7/10; B62B 7/12; B62B 9/245; B62B 11/00
See application file for complete search history.

(56) References Cited

U.S. PATENT DOCUMENTS 2,625,407 A * 1/1953 Varner ..................... B62B 7/08
280/643
3,961,803 A * 6/1976 Fleischer ................ A47D 13/02
280/42
4,647,054 A * 3/1987 Chong ................. B60N 2/2848
280/30
4,747,526 A * 5/1988 Launes .................... A47D 1/02
224/155

(Continued)

FOREIGN PATENT DOCUMENTS

| KR | 200169798 | 2/2000 |
|---|---|---|
| KR | 19990037785 | 4/2001 |
| KR | 101054245 | 4/2011 |

*Primary Examiner* — J. Allen Shriver, II
*Assistant Examiner* — Travis Coolman
(74) *Attorney, Agent, or Firm* — Stetina Brunda Garred & Brucker

(57) ABSTRACT

A multi-function baby carriage comprising: base frames; a back frame installed at rear ends of the base frames to switch between a vertical position and a horizontal position and formed with a U-shaped hanger at its top for being suspended from a user's neck or a headrest of a car; a seat on the base frames to accommodate a baby; and wheel means below the base frames, wherein said wheel means include front and rear wheels, front and rear connectors, a front cross member connecting the front connectors, a rear cross member connecting the rear connectors, each of said front and rear connectors having an end rotatably connected to one of the front and rear wheels and the other end connected to one of axes, wherein said shaft is provided with a ball member, so that when the front or rear wheels are folded or unfolded, said shaft causes the front and rear wheels to move at the same time and said ball member passes through a ball holding member in a forward or backward direction to make said ball member to stop at a front or rear end of said ball holding member, to thereby maintain a folding state or an unfolding state of the front and rear wheels, and wherein said ball holding member has a cylindrical form that can expand in a radial-outward direction and retract in a radial-inward direction.

4 Claims, 9 Drawing Sheets

(51) Int. Cl.
*B60N 2/28* (2006.01)
*A47D 13/02* (2006.01)
*A47D 11/00* (2006.01)

(56) References Cited

U.S. PATENT DOCUMENTS

| | | | | |
|---|---|---|---|---|
| 4,872,693 | A * | 10/1989 | Kennel | B60N 2/2845 280/30 |
| 4,989,888 | A * | 2/1991 | Qureshi | B60N 2/2848 280/30 |
| 5,104,134 | A * | 4/1992 | Cone | B60N 2/2848 280/30 |
| 5,133,567 | A * | 7/1992 | Owens | B62B 7/12 16/445 |
| 5,398,951 | A * | 3/1995 | Ryu | B60N 2/2848 280/30 |
| D361,743 | S * | 8/1995 | Matsumoto | D12/129 |
| 5,478,096 | A * | 12/1995 | Ting | B62B 7/12 108/68 |
| 5,823,547 | A * | 10/1998 | Otobe | B60N 2/2839 280/30 |
| 6,139,046 | A * | 10/2000 | Aalund | B62B 7/08 280/47.38 |
| 7,090,291 | B2 * | 8/2006 | Birchfield | B60N 2/2845 280/30 |
| 7,871,099 | B2 * | 1/2011 | Gilbertson | B62B 7/06 280/43.16 |
| 9,227,648 | B2 * | 1/2016 | Sundberg | B62B 7/12 |
| 2016/0029813 | A1 * | 2/2016 | Kast | B60N 2/2845 280/30 |

* cited by examiner

MULTI-FUNCTION BABY CARRIAGE

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention relates to a baby carriage. More particularly, the present invention relates to a multi-function baby carriage that can be readily transformed from a wheel-based stroller to a carrier dangling from a neck, a baby-car seat or a baby bed, as necessary.

Generally, the baby carriage is convenient transportation means for a baby. However, the baby carriage is the wheel-based transportation means, and thus, the baby carriage should be lifted and moved by efforts when there are irregular road surfaces, steps or an obstacle area or when it is loaded on or unloaded from a bus. Due to its weight, it is difficult to lift and move the baby carriage.

In order to address this problem, KR 20-0169798 and KR 1999-0037785 disclose a structure which combines a baby carriage with a carrier structure. Accordingly, the baby carriage disclosed in these documents may perform the wheel-based transportation or may be conveniently lifted and moved similarly to a general carrier.

However, the above prior arts are no more than a simple addition of a carrier structure to a baby carriage, so that a whole structure is complicated and its total weight is heavier than that of a baby carriage. Accordingly, in practice, it was very inconvenient to be used as a carrier.

Additionally, it is very inconvenient to handle a carrier when the baby carriage is used as a carrier.

Further, each of the above prior arts limits its functions only to a baby carriage and a carrier. Accordingly, it is inefficient when using the baby carriage.

BRIEF SUMMARY

The present invention is to solve the above-stated problems of the prior arts. The object of the present invention is to provide a multi-function baby carriage which can be transformed from a wheel-based stroller to a carrier dangling from a neck, a baby-car seat or a baby bed as necessary.

Another object of the present invention is to provide a multi-function baby carriage which makes it possible to simultaneously fold/unfold front and rear wheels and to fold/unfold a front guard panel, to thereby improve the safety and the convenience.

According to the present invention, a multi-function baby carriage is provided with comprises:
base frames;
a back frame installed at rear ends of the base frames to switch between a vertical position and a horizontal position and formed with a U-shaped hanger at its top for being suspended from a user's neck or a headrest of a car;
a seat on the base frames to accommodate a baby; and
wheel means below the base frames,
wherein said wheel means include front and rear wheels, front and rear connectors, a front cross member connecting the front connectors, a rear cross member connecting the rear connectors, each of said front and rear connectors having an end rotatably connected to one of the front and rear wheels and the other end connected to one of axes,
wherein said shaft is provided with a ball member, so that when the front or rear wheels are folded or unfolded, said shaft causes the front and rear wheels to move at the same time and said ball member passes through a ball holding member in a forward or backward direction to make said ball member to stop at a front or rear end of said ball holding member, to thereby maintain a folding state or an unfolding state of the front and rear wheels, and
wherein said ball holding member has a cylindrical form that can expand in a radial-outward direction and retract in a radial-inward direction.

According to one aspect of the present invention, said shaft includes a first shaft and a second shaft connected by means of one or more universal joints, and said first and second shafts perform the translational movement in a forward or backward direction, along with articulation movements thereof.

According to the other aspect of the present invention, it further comprises a guard panel located at front ends of said base frames for rotating about hinge axes between an upright position and a lowered position, wherein said guard panel includes a bumper member along its peripheral edge so as to absorb shock.

The multi-function baby carriage according to the present invention can be readily transformed from a wheel-based stroller to one of a carrier, a baby-car seat and a baby-bed, wherein the carrier is suspended from the user's neck and the baby-car seat is suspended from a head rest of a car seat and wherein the baby bed is formed by lowering a back frame. Accordingly, the multi-function baby carriage of the present invention is significantly effective in its performance.

In the multi-function baby carriage of the present invention, the front and rear wheels may be folded or unfolded as necessary, wherein the operation of the front and rear wheels can be simultaneously performed. Also, the guard panel located at a front end of the baby carriage may be folded or unfolded, so that it is used for protecting a baby against shock or for serving as support legs of the baby carriage. Accordingly, the multi-function baby carriage of the present invention may provide the convenience and the safety in use.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
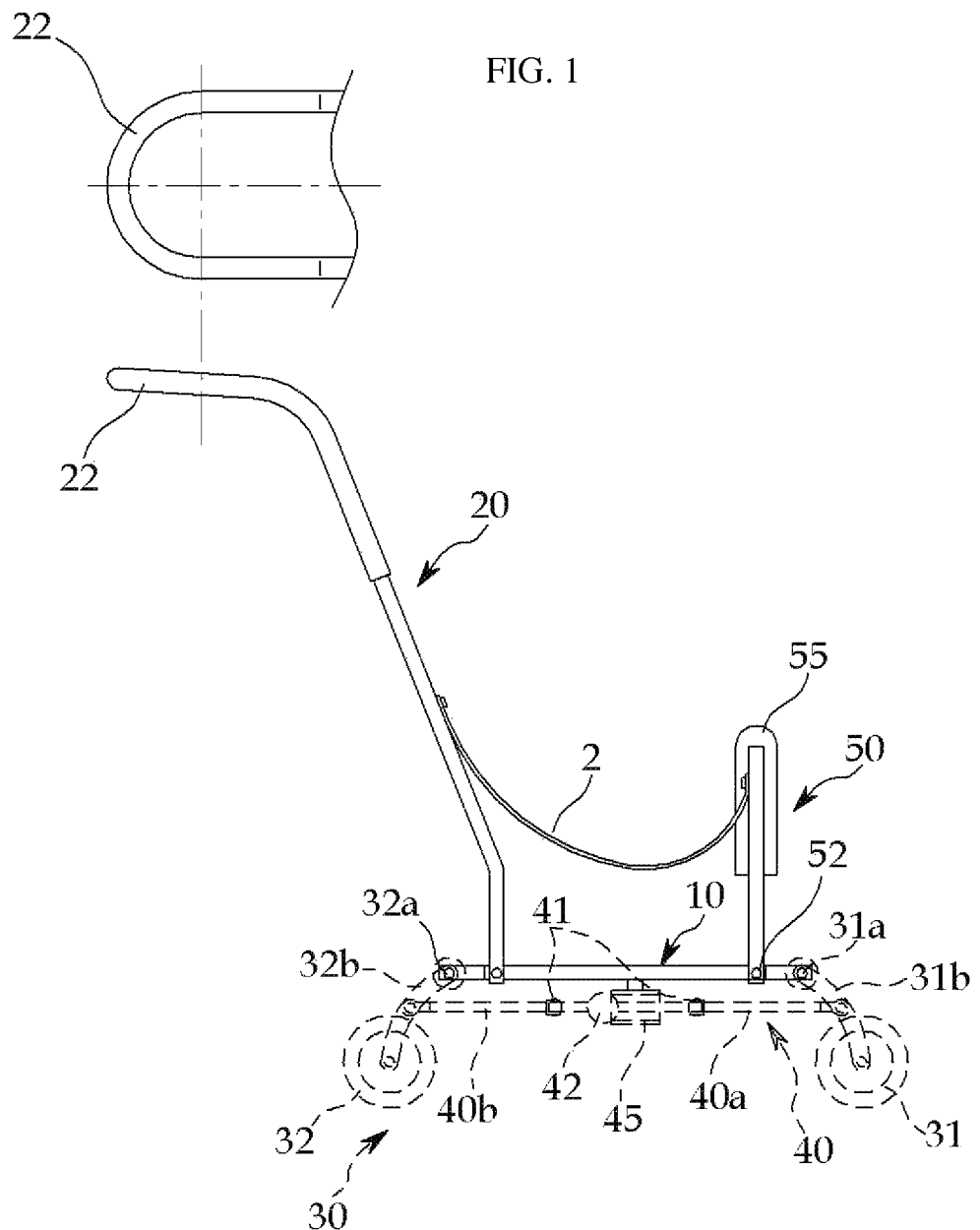
FIG. 1 is a side view of the present invention.

The present invention will detailed herein-below with reference to a preferred embodiment of the present invention.

The multi-function baby carriage of the present invention may be changed in its configuration so as to perform four different functions, such as a wheel-based stroller, a carrier dangling from a neck, a baby bed and a baby-car seat as shown in FIGS. 1-6.

The multi-function baby carriage of the present invention comprises: base frames (10); a back frame (20) installed at a rear end of the base frames (10) to switch between a vertical position and a horizontal position, said back frame including a U-shaped hanger (22) at its top for being suspended from a user's neck or a headrest of a car; a seat (2) on the base frames (10) to accommodate a baby; and wheel means (30) under the base frames (10).

Figure 2:
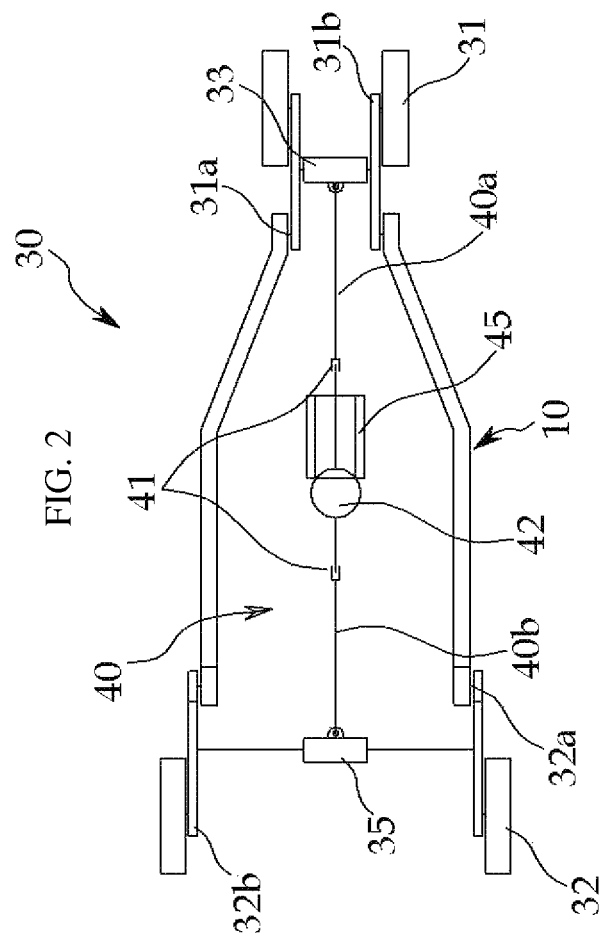
FIG. 2 is a schematic top view of wheel means according to the present invention.
Figure 3:
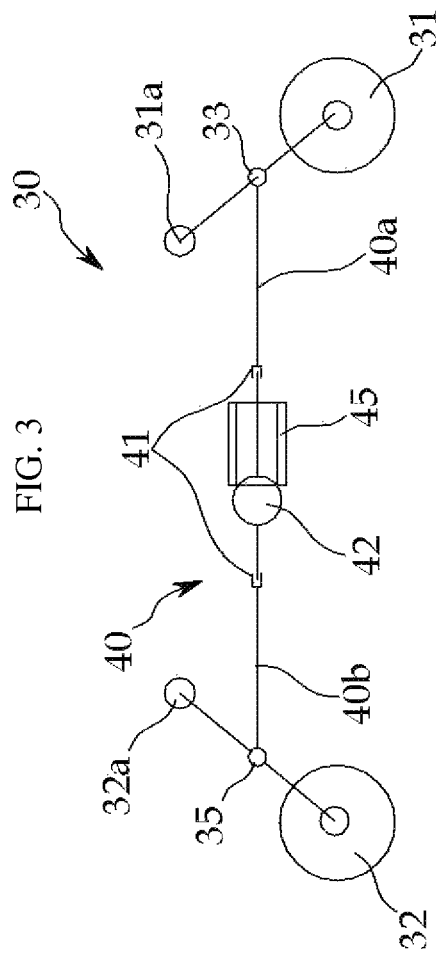
FIG. 3 is a front view of wheel means according to the present invention.

The wheel means (30) includes: front wheels (31) and rear wheels (32); front connectors (31b), each of which has an end rotatably connected to one of the front wheels (31) and the other end rotatably connected to one of the base frames (10) at an axis (31a); rear connectors (32b), each of which has an end rotatably connected to one of the rear wheels (32) and the other end rotatably connected to one of the base frames at an axis (32a); a front cross member (33) connecting said front connectors (31b); a rear cross member (35) connecting said rear connectors (32b); and a shaft (40) extending through one or more universal joints (41) and having ends respectively hinged to the front and rear cross members (33, 35, FIG. 2).

The shaft (40) is further provided with a ball member (42) and a ball holding member (45). When the front and rear wheels are folded or unfolded, the front and rear wheels (31, 32) are simultaneously operated by means of the shaft (40). At the same time, the ball member (42) passes through the ball holding member (45) in a forward or backward direction and stops at a front or rear end of the ball holding member (42). The ball holding member (45), which is formed to have a cylinder shape, can expand or retract in a radial direction, so that it allows the ball member (42) to pass there-through when in an expanded state and it blocks the ball member (42) from passing there-through when in a retracted state. When the ball member (42) stops at the front or rear end of the ball holding member (45), the front and rear wheels (31, 32) may be maintained in a folding state or an unfolding state.

The ball holding member (45) are formed by winding an elastic wire to have a cylindrical form, which may elastically expand in a radial-outward direction or retract in a radial-inward direction to return to its original configuration. The ball holding member (45) is installed below the middle of the base frames (10).

The shaft (40) has a first shaft (40a), a second shaft (40b) and the ball member (42) there-between, wherein an end of the first shaft (40a) is rotatably connected to the front cross member (33, FIG. 2) and an end of the second shaft (40b) is rotatably connected to the rear cross member (35, FIG. 2). The first and second shafts (40a, 40b) are connected by means of one or more universal joints (41) to thereby enable the translational movement in a forward or backward direction, along with the articulation movements.

A guard panel (50) is installed at a front end of the base frames (10) to rotate about a hinge axis (52) between an upright position and a lowered position.

Here, when the guard panel (50) is in the upright position on the base frames (10), it is used to protect a baby sitting on the seat (12) against falling from the front end for the safety purpose. When the guard panel (50) is in the lowered position (i.e., the baby carriage is used as the baby bed), the guard panel (50) is supported on ground to thereby serve as a fixation leg for preventing the forward and backward movement of the baby carriage.

The guard panel (50) is formed with a cutout (51) at its center for letting the front wheels (31) pass there-through, so that an intervention can be avoided when the front wheels (31) are folded. The guard panel (50) is provided with a bumper member (55) fitted along its upper, right and left edges, which has shock-absorbing function.

The seat (2) may be a wide belt on which a baby can sit with his/her legs apart. The seat (20) is formed with holes (2a) at either ends, so that a stud (3) on the guard panel (50) and a stud (not shown) on the back frame (20) can be inserted into the holes (2a). Accordingly, the seat (2) is suspended between the guard panel and the back frame. There may be numerous ways for suspending the seat (2).

Herein-below, the present invention will be described with respect to its function and operation.

The baby carriage according to the present invention has four functions and may be used as the stroller, the carrier suspending from a neck, the baby-bed or the baby-car seat by means of easy transformation.

First, when the baby carriage is used as the stroller, the baby sits on the seat (2) and the stroller can travel using the wheel means (30).

Figure 7:
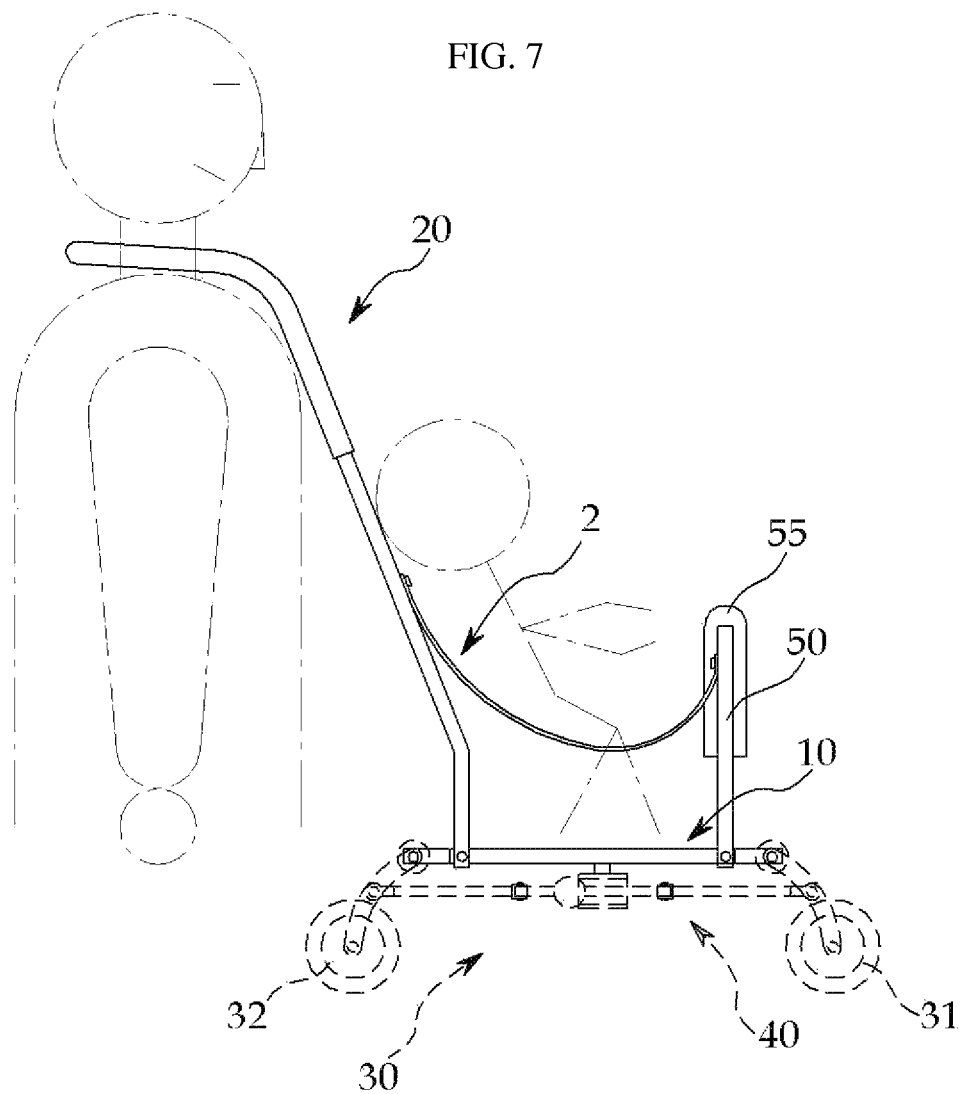
FIGS. 7-9 are side views showing various states of the present invention.

When it is impossible to move as the stroller, and thus, it is needed to switch the stroller to the carrier, as shown in FIG. 7, the user may wear the baby carriage by inserting his neck into the U-shaped hanger (22) to thereby lift the baby carriage without any further operation. Accordingly, it is possible to move the baby carriage with convenience.

Figure 8:
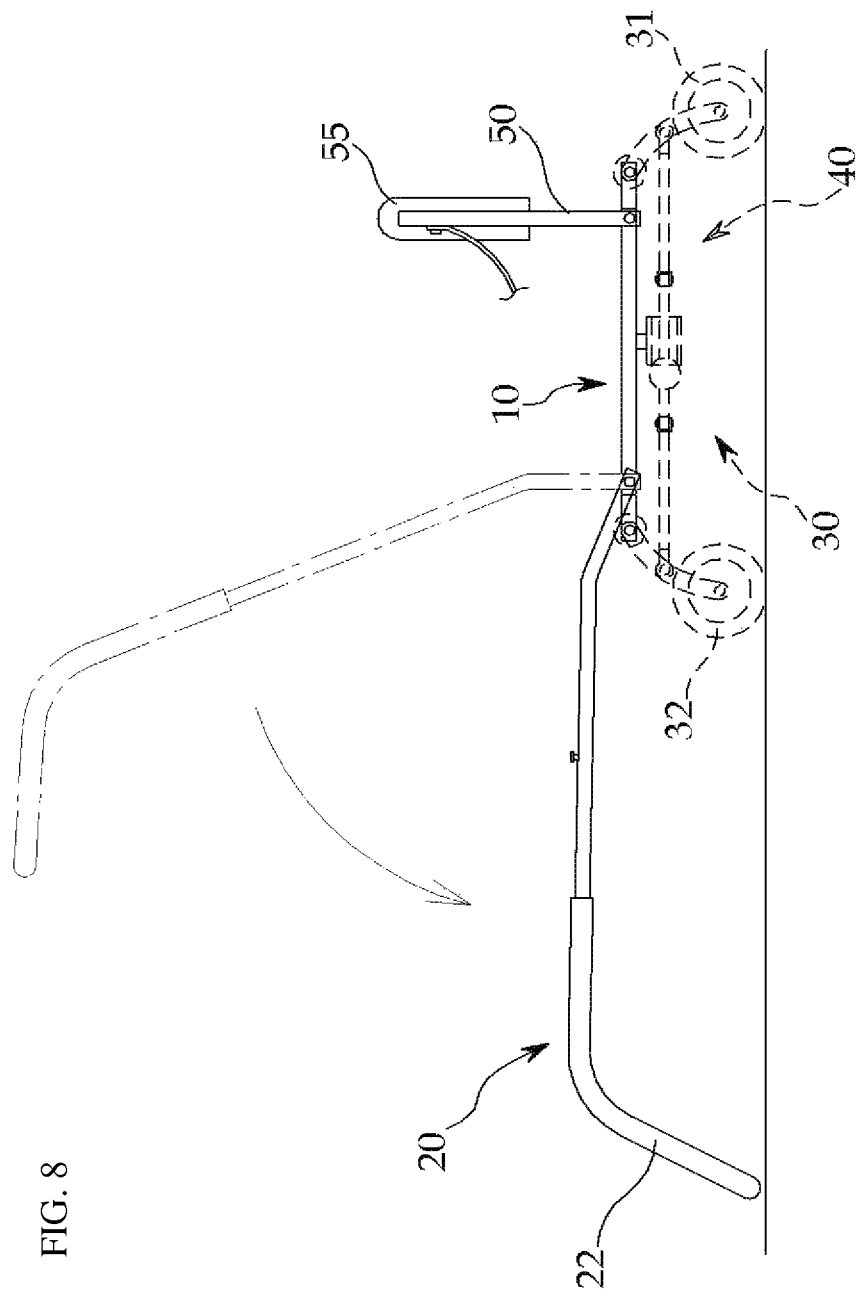

When it is needed to be switched to the baby bed, as shown in FIG. 8, the back frame (20) may be rotated around an axis on the base frames (10) to reach a horizontal position. Accordingly, the baby carriage may be used as the baby bed.

Figure 4:
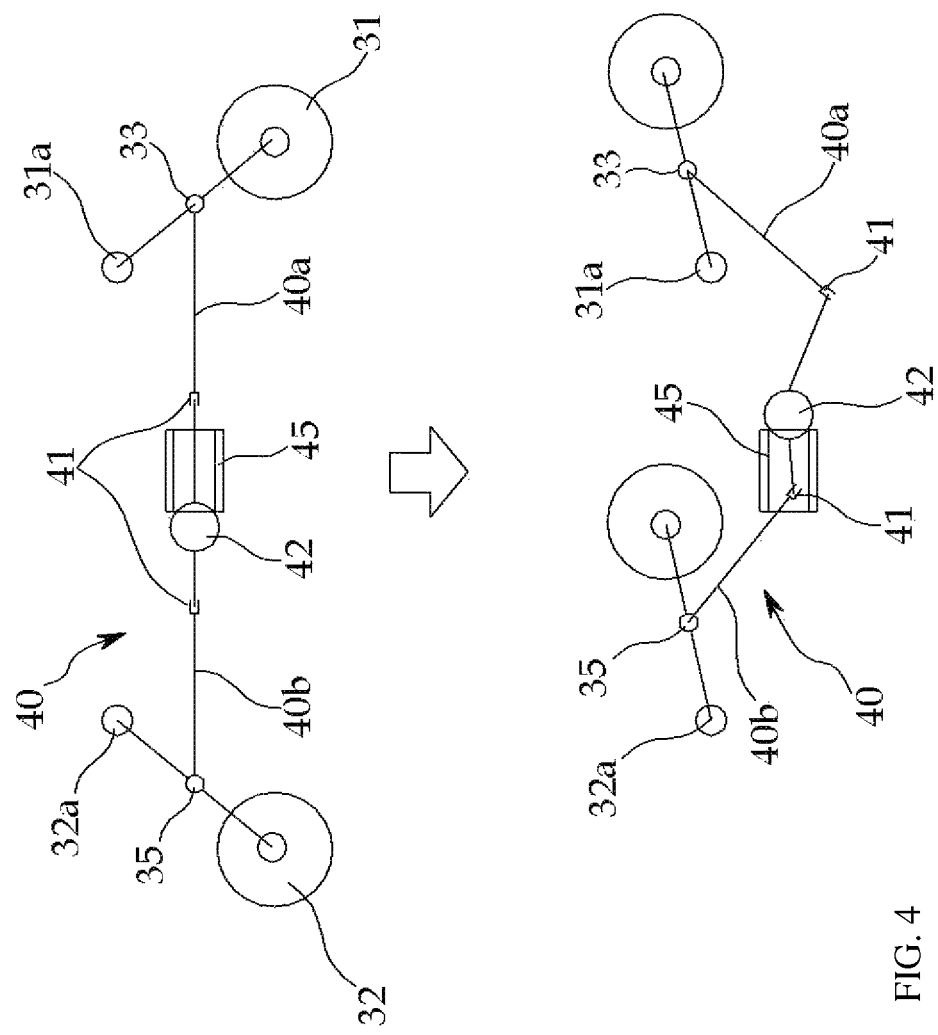
FIG. 4 is a front view showing the process of the wheel means of FIG. 3.
Figure 5:
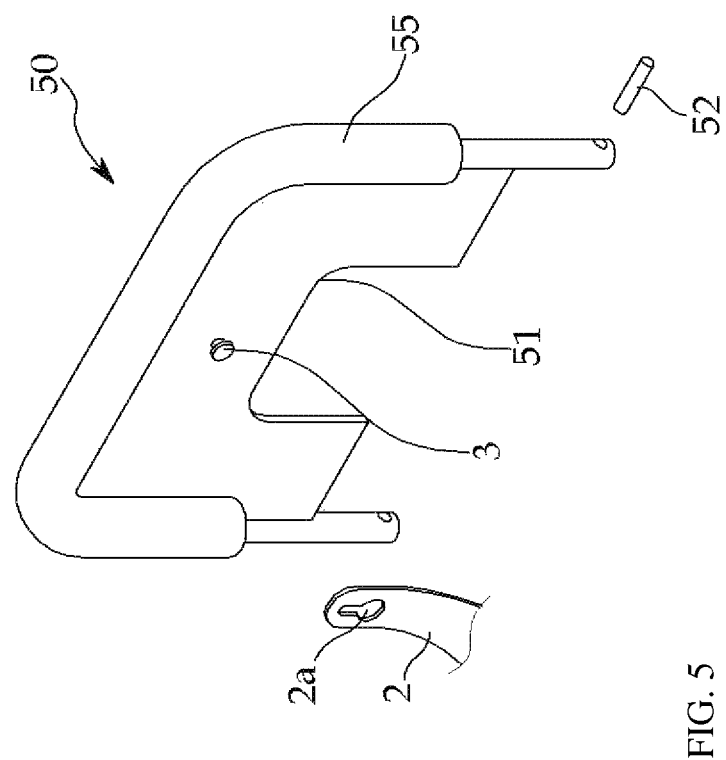
FIG. 5 is a perspective view showing a guard panel of the present invention.
Figure 6:
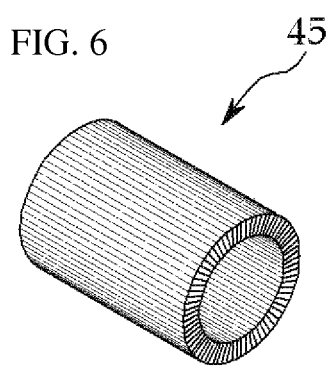
FIG. 6 is a perspective view of a ball-holding member.
Figure 9:
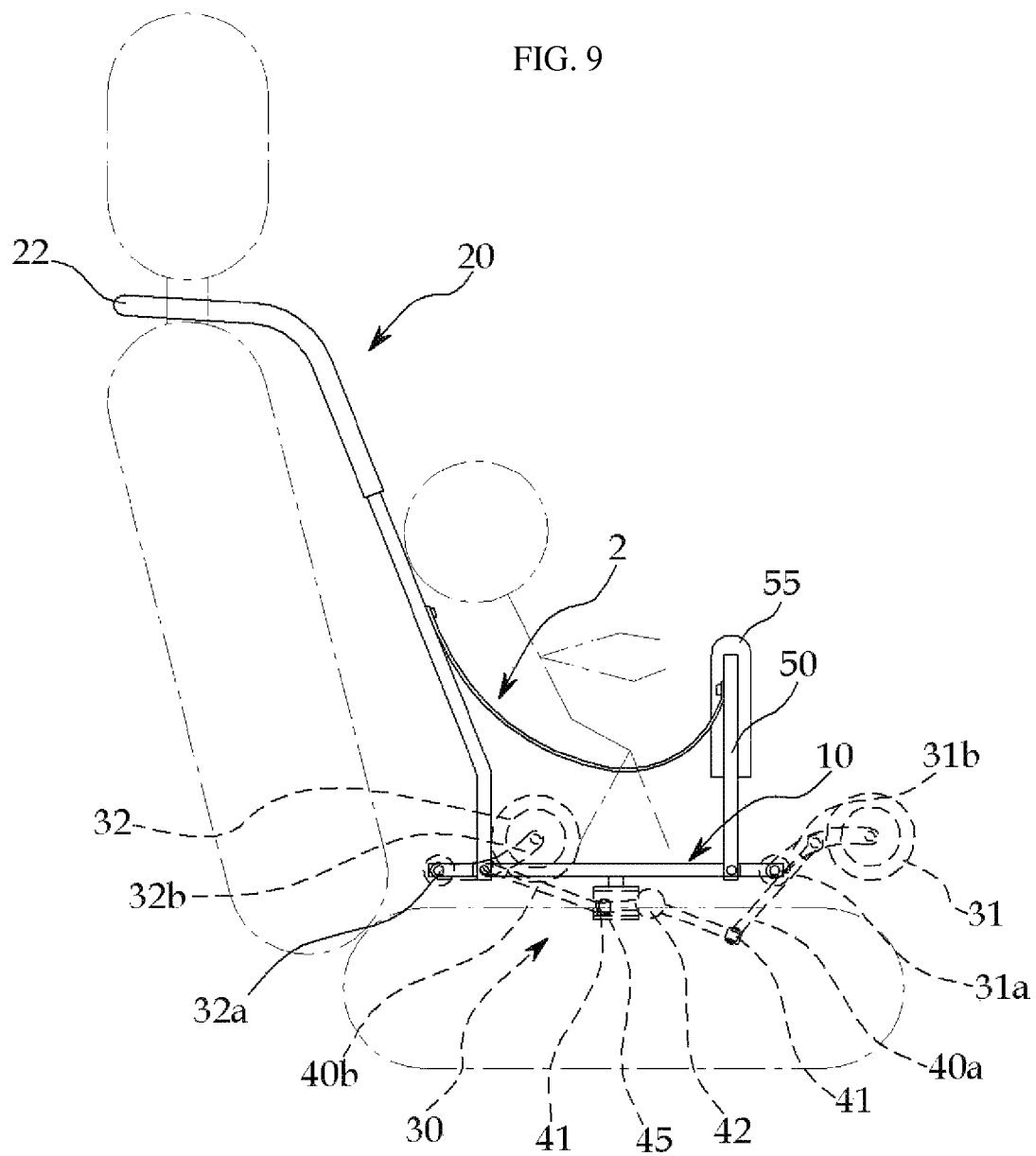

When it is needed to switch the baby carriage to the baby-car seat, the wheel means (3) are folded as shown in FIGS. 4 and 9.

Here, the front connectors (31b) rotate around the axis (31a) with the front wheels (31) at their ends, while the rear connectors (32b) rotate around the axis (32a) with the rear wheels (32) at their ends. At the same time, the shaft (40), the ends of which are respectively connected to the front and rear cross members (33, 35), rotates along with the rotation of the front and rear connectors.

Also, while the front and rear wheels (31, 32) are being folded, the ball member (42) located in the middle of the shaft (40) forcibly expands the ball holding member (45) to thereby pass there-through.

Since the first shaft (40a) and the second shaft (40b) are connected to each other by means of the universal joints (41) with the ball member (42) located there-between, theses shafts can move forward along with the articulation movement thereof, to thereby fold the front and rear wheels (31, 32).

While folding the front wheels (31) and the rear wheels (32), the ball member (42) in the middle of the shaft (40) passes though the ball holding member (45) with the expansion of the ball holding member (45). Thereafter, the ball holding member (45) retracts to return to its original configuration, so that it can support the ball member (42) at the front end of the ball holding member (45) to thereby block the ball member (42) from moving backward. Thus, it is possible to maintain the wheels in the folded state.

While the front and rear wheels (31, 32) are in the folded state, the baby carriage may be mounted to the car seat of the vehicle.

Here, the U-shaped hanger (22) on a top of the back frame (20) is engaged with the headrest of the car seat, so that the baby carriage can be safely supported.

The guard panel (50) at the front end of the baby carriage is provided with the bumper member (55) along its peripheral edge, so that it is possible to absorb the shock in an accident.

When the baby carriage is used as the baby-car seat, the back frame (30) is installed by dangling the back frame (20) from the headrest of the car seat, so that the separation of the baby-car seat from the car seat is impossible. Thus, it can improve the safety. Also, the guard panel (50) and the bumper member (55) can absorb the shock from a head on collision to thereby ensure the safety.

If it is needed to separate the baby carriage from the car seat and use it as the stroller, the wheel means (30) are unfolded to return to its original configuration as shown in FIG. 1. Here, if the user unfolds the front wheels (31) or the rear wheels (32), it causes all the wheels to be unfolded at the same time due to the operation of the shaft (40). Thus, the simple operation is possible.

Additionally, when unfolding the wheel means (30), the ball member (42) in the middle of the shaft (40) expands the ball holding member (45) and then passes through the ball holding member (45) so as to return to its original position. After completion of unfolding the wheel means and passing the ball member (42) through the ball holding member (45), the ball holding member (45) retracts to return to its original configuration, to thereby prevent the ball member (42) from moving forward, so that it maintains the wheel means in the unfolding state.

It is possible to provide any kind of stopper means for preventing further rotation of the front and rear wheels (31, 32) from the folding state or the unfolding state of the wheel means (30).

What is claimed is:

1. A multi-function baby carriage comprising:
   base frames;
   a back, frame installed at rear ends of the base frames to switch between a vertical position and a horizontal position and formed with a U-shaped hanger at its top for being suspended from a user's neck or a headrest of a car;
   a seat on the base frames to accommodate a baby; and
   wheel means below the base frames,
   wherein said wheel means include front and rear wheels, front and rear connectors, a front cross member connecting the front connectors, a rear cross member connecting the rear connectors, each of said front and rear connectors having an end rotatably connected to one of the front and rear wheels and the other end rotatably connected to one of the base frames, and a shaft extending through one or more universal joints and having ends respectively hinged to the front and rear cross members,
   wherein said shaft is provided with a ball member, so that when the front or rear wheels are folded or unfolded, said shaft causes the front and rear wheels to move at the same time and said ball member passes through a ball holding member in a forward or backward direction to make said ball member to stop at a front or rear end of said ball holding member, to thereby maintain a folding state or an unfolding state of the front and rear wheels, and
   wherein said ball holding member has a cylindrical form that can expand in a radially-outward direction and retract in a radially-inward direction.

2. The multi-function baby carriage as claimed in claim 1, wherein said shaft includes a first shaft and a second shaft connected by means of one or more universal joints, and
   wherein said first and second shafts perform translational movement in a forward or backward direction, along with articulation movements thereof.

3. The multi-function baby carriage as claimed in claim 1, further comprising a guard panel located at front ends of said base frames for rotating about hinge axes between an upright position and a lowered position, wherein said guard panel includes a bumper member along its peripheral edge so as to absorb shock.

4. The multi-function baby carriage as claimed in claim 2, further comprising a guard panel located at front ends of said base frames for rotating about hinge axes between an upright position and a lowered position, wherein said guard panel includes a bumper member along its peripheral edge so as to absorb shock.

* * * * *